United States Patent [19]

Kakui

[11] 4,097,207
[45] Jun. 27, 1978

[54] CASING FOR LIQUID-COOLED ROTARY PISTON ENGINES

[75] Inventor: Kuniaki Kakui, Aki, Japan

[73] Assignee: Toyo Kogyo Co., Ltd., Japan

[21] Appl. No.: 736,326

[22] Filed: Oct. 28, 1976

[30] Foreign Application Priority Data

Mar. 15, 1976 Japan .................................. 51-29561

[51] Int. Cl.² .................. F01C 21/06; F01C 21/10
[52] U.S. Cl. ........................................ 418/83; 418/179; 123/41.71
[58] Field of Search .................. 418/83, 149, 179; 123/8.01, 41.71

[56] References Cited

U.S. PATENT DOCUMENTS

| | | | |
|---|---|---|---|
| 3,033,180 | 5/1962 | Bentele | 418/179 |
| 3,575,538 | 4/1971 | Berkowitz et al. | 418/83 |
| 3,791,781 | 2/1974 | Fujiyama et al. | 418/179 |
| 3,975,122 | 8/1976 | Hackbarth et al. | 418/83 |

Primary Examiner—John J. Vrablik
Attorney, Agent, or Firm—Fleit & Jacobson

[57] ABSTRACT

Casing for liquid-cooled rotary piston engines having a rotor housing made of aluminum based alloy and side housings made of cast iron. The rotor and side housings are formed with cooling liquid passages which are connected together at the junction between the rotor and side housings. At each junction of the passage in the rotor housing with corresponding one in the side housing, the diametrical dimension of the passage in the aluminum alloy rotor housing is smaller than that of the passage in the cast iron side housing so that a shoulder is formed at the junction of the passages by aluminum alloy surface projecting into the passage beyond the edge of the passage opening in the cast iron side housing. The arrangement is effective to prevent or suppress electrochemical corrosion of the casting material.

4 Claims, 7 Drawing Figures

CASING FOR LIQUID-COOLED ROTARY PISTON ENGINES

The present invention relates to rotary piston engines and more particularly to rotor casings therefor.

Conventional rotary piston engines include a rotor casing which comprises a rotor housing having an inner wall of trochoidal configuration and a pair of side housings gas tightly secured to the opposite sides of the rotor housing to define a cavity of trochoidal configuration. A substantially polygonal rotor is disposed in the cavity for rotation and revolution with apex portions in sliding contact with the trochoidal inner wall of the rotor housing to define working chambers of variable volume between flanks of the polygonal rotor and the inner wall of the rotor housing.

In liquid-cooled rotary piston engines of this type, cooling-liquid passages are formed in the side housings and such passages are connected with corresponding cooling-liquid passages formed in the rotor housing. In order to provide a hermetic seal at the connections between the rotor housing and the side housings, suitable sealing means such as O-ring seals are used between the side faces of the rotor housing and the co-operating mating surface of the side housings.

In this type of rotary piston engines, it has already been proposed from the viewpoint of cooling efficiency, strength, weight and manufacturing cost to form one of the side and rotor housings from aluminum based alloy which is light in weight and has a high thermal conductivity, and the other from cast iron which has a higher rigidity and is less expensive than aluminum based alloy. For example, the rotor housing is made of aluminum alloy and the side housings are made of cast iron.

Although such engine is so designed that each of the cooling liquid passages in the rotor housing is to be in exact alignment with corresponding one of each side housing, actual manufacturing tolerance produces a misalignment of the passages leaving a step or shoulder at the junction of such passages in the rotor and side housings. Since there is a tendency that cast iron products have actual dimensions greater than the nominal or designed dimensions, it is most likely that, in the rotary piston engine of the aforementioned design, the cast iron housings have greater wall thicknesses than design values and consequently smaller diametrical dimensions of the passages as compared with the passages in the aluminum based alloy housings. As a result, the aforementioned step or shoulder at the junction of the passages in the rotor and side housings is apt to be formed by the casting iron material extending into the passage in the aluminum alloy housing. This will produce an adverse effect on the life of the housing materials as hereinafter described.

As well known in the art, the passages of the cast iron and aluminum alloy housings are formed on their surfaces with coatings of oxides, while the mating surfaces of the housings are machined so that the basic metals are exposed at the mating surfaces. Thus, the basic cast iron material will be located adjacent to the coating of aluminum oxides on the passage in the aluminum based alloy housing at the junction of the passages in the cast iron and aluminum alloy housings.

Comparing aluminum alloy, cast iron and their oxides from the viewpoint of electrochemical series, the oxide of aluminum alloy has the highest electrolytic dissociation but the cast iron the lowest. The electrolytic dissociation of aluminum alloy is lower than that of its oxide but higher than those of the cast iron and its oxide. Further, the electrolytic dissociation of the oxide of cast iron is higher than that of cast iron itself. Therefore, in the casing structure as described above, there will be the greatest possibility that the housing materials will be subjected to corrosion due to electrochemical reaction at the junction area when the passages are filled with engine cooling-liquid. Even if the cooling liquid is added with anti-corrosion agent, it will not be effective to prevent such corrosion because pure water will be added to compensate for consumption of cooling liquid through prolonged operation of the engine and thus the anticorrosion agent will be diluted to such an extent that it no longer has any effect for preventing corrosion.

The present invention has therefore an object to provide a rotor casing for rotary piston engines, in which electrochemical corrosion can be minimized.

Another object of the present invention is to provide means for minimizing electrochemical corrosion in a casing of water-cooled rotary piston engines, which comprises aluminum based alloy and cast iron housings that are connected together through mating surfaces.

According to the present invention the above and other objects can be accomplished by a casing for liquid-cooled rotary piston engines which comprises a rotor housing having an inner wall of trochoidal configuration, a pair of side housings secured to the opposite sides of the rotor housing at mating surfaces thereof to define a cavity of trochoidal configuration for receiving a substantially polygonal rotor therein, one of said rotor and side housings being formed by an aluminum based alloy and the other by a cast iron, each of said side housings having cooling-liquid passage means opening to said mating surface at a plurality of locations, said rotor housing being formed with cooling-liquid passage means opening to each of said mating surfaces at locations corresponding to locations of the openings of the passage means in said side housing and connected with the corresponding passage openings in the side housings, the cooling-liquid passage means formed in the housing of aluminum based alloy having a diametrical dimension at the opening in the mating surface smaller than that of the corresponding passage in the housing of cast iron so that a shoulder is formed at junction of each passage opening in the rotor housing with that of the side housing by aluminum alloy surface projecting into the opening. Usually, the rotor housing is made of aluminum based alloy and the side housings of cast iron. In such a case, the passage in the rotor housing has a diametrical dimension at the mating surface smaller than that of the passage in the side housing. However, when the side housings are made of aluminum alloy and the rotor housing of cast iron, the passage in each of the side housings has a smaller diametrical dimension than that in the rotor housing. The term "diametrical dimension" is used to mean the height and/or width of the cross-section of the passage opening at the mating surface and it should be understood that the present invention contemplates making at least one of the height and width of the passage opening at the mating surface on the aluminum alloy housing smaller than that of the corresponding passage opening in the cast iron housing.

According to the present invention, a step or shoulder is thus formed at the junction between the passage in the aluminum based alloy housing and the corresponding passage in the cast iron housing by aluminum alloy material projecting into the opening of the passage in the cast iron housing. Therefore, a machined aluminum alloy surface is located adjacent to the passage surface in the cast iron housing. In the electrochemical series, aluminum alloy is comparatively close to the oxide of cast iron so that the tendency of electrochemical corrosion can be significantly decreased.

Preferably, such step in the junction of the passages is in the range between 0.3 and 3 mm in width. Such step should be provided at least in a side of the passage which is radially inward of the rotor housing, however, it is preferable to provide such step throughout the periphery of the opening.

The above and other objects and features of the present invention will become apparent from the following description of preferred embodiments taking reference to the accompanying drawings, in which.

Figure 1:
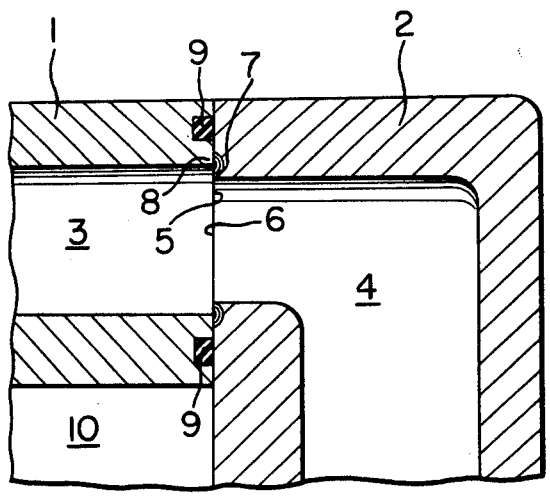
FIG. 1 is a fragmentary sectional view of a casing for water-cooled rotary piston engines in accordance with a conventional design.

Referring first to FIG. 1, there is shown in a fragmentary section a casing for liquid-cooled rotary piston engines. The casing comprises a rotor housing 1 which is made of an aluminum alloy on a pair of side housings 2 made of cast iron and secured to the opposite sides of the rotor housing 1 at the mating surfaces thereof, although only one of such side housings 2 is shown in FIG. 1. The rotor housing 1 is formed with a plurality of cooling liquid passages 3, only one of which can be seen in FIG. 1. The side housing 2 is also formed with a plurality of cooling liquid passages 4 which are connected at the mating surfaces of the housings 1 and 2 with corresponding one of the passages 3 in the rotor housing 1. In order to provide gas-tightness at the connection between the housings 1 and 2, O-ring seals 9 are used as well known in the art. Thus, a cavity 10 is defined in the casing for receiving a rotor.

Although the passages 3 and 4 are so designed that they come to exact alignment with each other, there is a tendency that the passage 4 in the cast iron housing 2 has a smaller diametrical dimension than the passage 3 in the aluminum alloy housing 1. Thus, at the junction between the passages 3 and 4, the edge 6 of the cast iron side housing 2 projects radially inward of the passage beyond the edge 8 of the aluminum alloy rotor housing 1 forming a step or shoulder 5. Thus, the machined cast iron surface is located next to the inner surface of the passage 3 which usually has an aluminum oxide film thereon. In electrochemical series, such aluminum oxide is comparatively remote from the cast iron, there is a strong tendency that the cast iron material is corroded through electrolytic reaction as shown by the reference numeral 7 when the passages 3 and 4 are filled with cooling liquid. Such corrosion proceeds along the mating surface of the cast iron housing 2 and as the corroded area extends to the O-ring seal 9, fluid tightness will be broken at the mating surface through a certain period of use.

Figure 2:
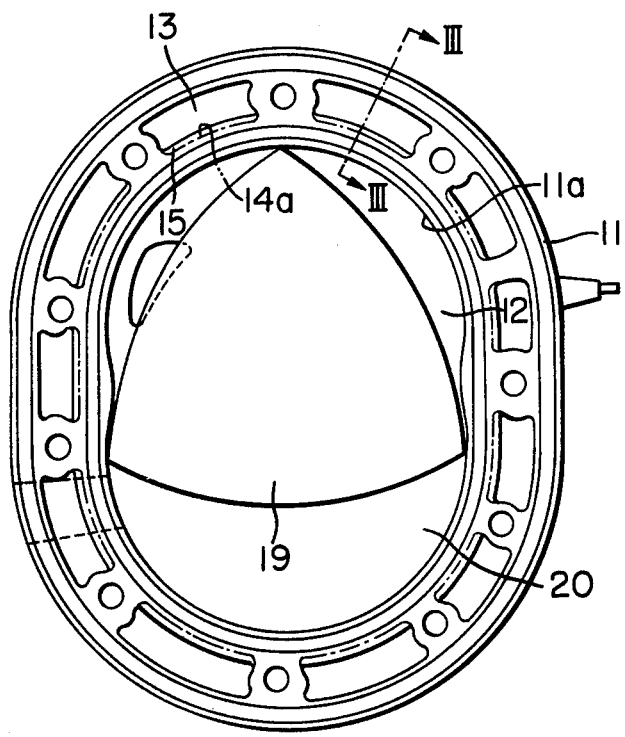
FIG. 2 is a sectional view of a rotary piston engine in accordance with one embodiment of the present invention.
Figure 3:
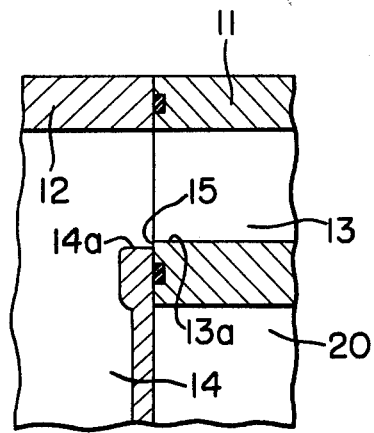
FIG. 3 is a fragmentary sectional view of the casing used in the rotary piston engine shown in FIG. 2.

Referring now to the embodiment of the present invention shown in FIGS. 2 and 3, the rotor casing comprises a rotor housing 11 having an inner wall 11a of trochoidal configuration and a pair of side housings 12 secured to the opposite sides of the rotor housing 11, although only one of the side housings 12 is shown in FIGS. 2 and 3. As in the casing shown in FIG. 1, the rotor housing 11 of this casing is made of aluminum based alloy and the side housings 12 of cast iron. A cavity 20 of trochoidal configuration is formed in the casing and a substantially triangular rotor 19 is disposed in said cavity 20 for rotation with apex portions in sliding contact with the inner wall 11a of the rotor housing 11.

The rotor housing 11 is formed with a plurality of cooling liquid passages 13, each opening to the side or mating surfaces of the rotor housing 11. The side housing 12 is also formed with cooling liquid passages 14 opening to the mating surface thereof at such positions that they can be connected with corresponding ones of the passages 13 in the rotor housing 11.

In the illustrated embodiments, each of the passages 13 in the rotor housing 11 has a wall 13a at the side radially inward of the rotor housing, which is offset with respect to the corresponding wall 14a of the corresponding passage 14 radially inward of the passage, to form a step or shoulder 15 by a portion of the machined mating surface of the rotor housing 11. Thus, in this embodiment, it should be noted that aluminum alloy exposed in the machined mating surface is located adjacent to the oxide film of cast iron which exists on the wall 14a of the passage 14 in the side housing 12. Since the aluminum alloy is comparatively close in electrochemical series to the oxide of cast iron there is less tendency at the side of the step 15 that the housing materials are subjected to electrochemical corrosion. This fact provides a significant advantage in view of the fact that the mating surfaces between the rotor housing 11 and the side housings 12 are subjected to the most serious sealing problem at the areas between the inner wall 11a of the rotor housing 11 and the cooling liquid passages 13 due to the influence of the heat and pressure produced in the working chambers. If corrosion prevails in these areas, gas-tight seal in the mating surfaces will be broken in a relatively short period. Since the embodiment is effective to suppress or a least decrease electrochemical corrosion in the aforementioned areas, the life of engine can be significantly increased.

Preferably, the step 15 has a width in the range of 0.3 to 3 mm. With the step width less than 0.3 mm, the aluminum oxide film which exists on the surface of the passage 13 in the aluminum alloy housing 11 will be located so close to the cast iron oxide film on the surface of the passage 14 in the cast iron housing 12 that there will be a decrease in the effect of suppressing electrochemical corrosion. With the step width greater than 3 mm, there will be an excessive increase in the resistance to cooling liquid flow.

Figure 4:
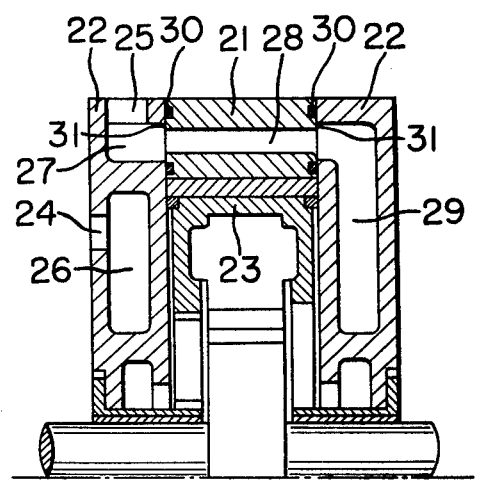
FIGS. 4 and 5 are fragmentary sectional views of a casing showing another embodiment of the present invention.

FIG. 4 shows another embodiment of the present invention. In this embodiment, the casing comprises a rotor housing 21 made of aluminum based alloy and a pair of side housings 22 made of cast iron and secured to the opposite sides of the rotor housing 21 with intervention of O-ring seals 30. A rotor 23 is disposed in the cavity defined in the casing. As in the previous embodiment, the rotor housing 21 is formed with a plurality of cooling liquid passages 28 extending therethrough in the direction of axis of the rotor.

Figure 5:
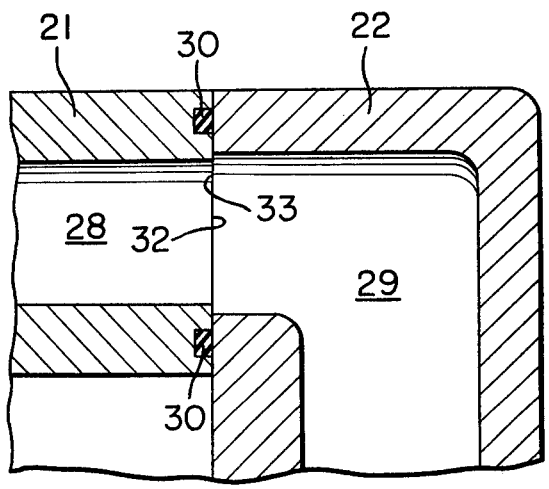

One of the side housings 22 is formed with a cooling liquid inlet port 24 and an exit port 25. The other of the side housings 22 is formed with cooling liquid passages 29. The inlet 24 is connected with a passage 26 which is in turn connected through some of the passages 28 with the passages 29 and then through the remaining passages 28 and a passage 27 in the side housing 22 with the exit port 25. In this embodiment, each of the passages 28 in the rotor housing 21 has a cross-section at the opening 32 to the mating surface, which is smaller in diametrical dimension than the openings 33 of the corresponding passages 27 and 29 so that steps 31 are formed throughout the peripheries of the passage 28 at respective junctions with the passages 27 and 29. It should be noted herein that in the embodiments of FIGS. 4 and 5, the steps 31 may be omitted at portions or walls separating adjacent passages 28.

Figure 6:
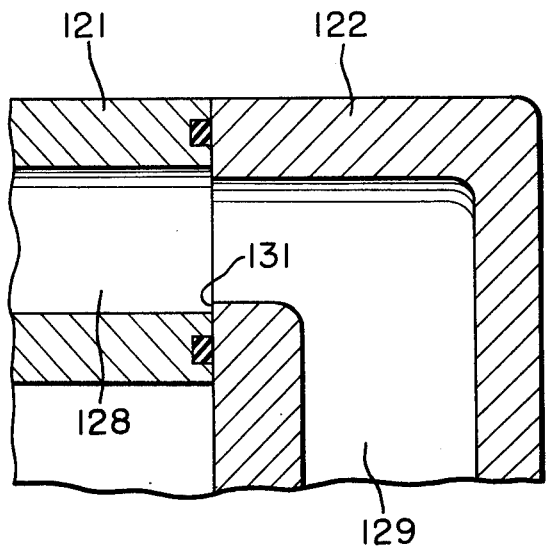
FIG. 6 is a fragmentary sectional view showing a further embodiment of the present invention.

In the embodiment shown in FIG. 6, the rotor housing 121 is made of cast iron and the side housing 122 of aluminum based alloy. In this embodiment, the passage 128 formed in the rotor housing 121 has a cross-section larger in diametrical dimension than the passage 129 in the side housing 122 so that the shoulder 131 is formed by the machined mating surface of the aluminum alloy housing 122.

In order to confirm the effects of the present invention, tests have been made using a rotary piston engine of conventional design and an engine made in accordance with the present invention. In the conventional engine as tested, the rotor housing was made of aluminum based alloy and the side housings of cast iron. At the junction of each passage in the rotor housing with corresponding passage in the side housing, a shoulder of 0.8 mm in width was formed by a side housing cast iron material projecting into the passage in the rotor housing beyond the edge thereof. A seal groove was formed on the mating surface of the rotor housing with a spacing of 1.5 mm from the nearest edge of the passage in the rotor housing to the edge of the seal groove.

The engine in accordance with the present invention also had a rotor housing made of aluminum alloy and side housing of cast iron. A shoulder of 0.8 mm in width was formed at the junction of the passage in the rotor housing and that in the side housing by projecting the aluminum alloy material radially inwardly of the passage beyond the edge of the passage opening in the side housing. A seal groove was formed in the mating surface of the rotor housing with its edge 1.5 mm distant from the nearest edge of the passage opening in the side housing.

Figure 7:
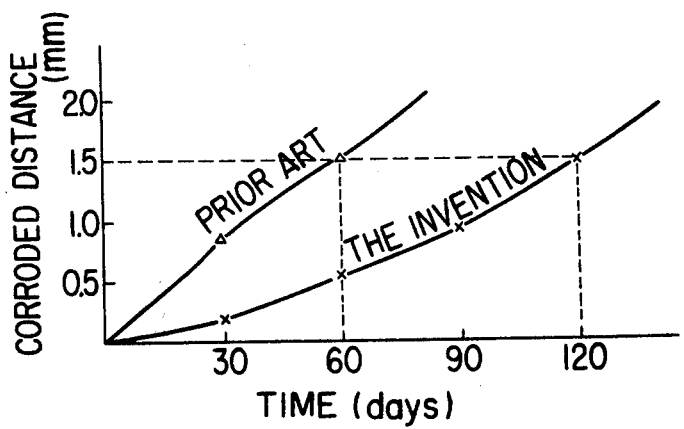
FIG. 7 is a diagram showing the effects as obtained by the present invention.

Tests were performed by circulating through the passages TYPE JASO engine cooling liquid with continuous addition of oxygen. The results are shown in FIG. 7. From the test results, it will be noted that the engine embodying the features of the present invention has a significantly improved corrosion resistant property.

The present invention has thus been shown and described with reference to specific embodiments, however, it should be noted that the invention is in no way limited to the details of the illustrated structures but changes and modifications may be made without departing from the scope of the appended claims.

I claim:

1. Casing for liquid-cooled rotary piston engine which comprises a rotor housing made of aluminum based alloy and having an inner wall of trochoidal configuration, a pair of side housings made of cast iron and secured to the opposite sides of the rotor housing at mating surfaces thereof to define a cavity of trochoidal configuration for receiving a substantially polygonal rotor therein, each of said side housings having cooling-liquid passage means opening to said mating surface at a plurality of locations, said rotor housing having cooling-liquid passage means opening to each of said mating surfaces at locations corresponding to locations of the openings of the passage means in said side housing and connected with the corresponding passage openings in the side housings, the cooling-liquid passage means formed in the rotor housing having a diametrical dimension at the opening in the mating surface smaller than that of the corresponding passage in the side housing so that a shoulder is formed at junction of each passage opening in the rotor housing with that of the side housing by an aluminum based alloy surface projecting into the opening.

2. Casing in accordance with claim 1 in which said shoulder is 0.3 to 3.0 mm in width.

3. Casing in accordance with claim 1 in which said shoulder is provided at a side of the passage opening which is radially inward of the rotor housing.

4. Casing in accordance with claim 1 in which said shoulder is provided throughout periphery of each junction between the passage in the rotor housing and that in the side housing.

* * * * *